(No Model.) 2 Sheets—Sheet 1.

H. H. HALL.
CAPPED MILK BOTTLE.

No. 531,796. Patented Jan. 1, 1895.

WITNESSES.
Howard D. Orr.
F. F. Shepard

INVENTOR.
Hayden H. Hall,
BY
J. R. Littell,
HIS ATTORNEY.

(No Model.) 2 Sheets—Sheet 2.

H. H. HALL.
CAPPED MILK BOTTLE.

No. 531,796. Patented Jan. 1, 1895.

WITNESSES.
Howard D. Orr.
T. R. Shepard

INVENTOR.
Hayden H. Hall,
BY J. R. Littell,
HIS ATTORNEY.

UNITED STATES PATENT OFFICE.

HAYDEN H. HALL, OF NEWTON, NEW JERSEY.

CAPPED MILK-BOTTLE.

SPECIFICATION forming part of Letters Patent No. 531,796, dated January 1, 1895.

Application filed April 5, 1894. Serial No. 506,375. (No model.)

*To all whom it may concern:*

Be it known that I, HAYDEN H. HALL, a citizen of the United States, residing at Newton, in the county of Sussex and State of New Jersey, have invented a new and useful Capped Milk-Bottle, of which the following is a specification.

This invention relates to milk bottles or jars of that class which are designed for use by dairy men for conveying milk and cream to the consumer, and the object of my invention is to provide a simple and improved bottle of this class, which will effectually prevent the milk or cream from being tampered with without detection, which will preclude the use of the bottle by unauthorized parties, which will effectually seal and protect the contents from adulteration during transit and retain the contents in pure condition, and which will furthermore possess advantages in point of inexpensiveness, convenience, ease of operation, cleanliness, durability, and general efficiency. Milk bottles and jars of this class have usually been provided with removable tops or caps of various constructions, employing tin, wire, and similar objectionable materials, which tops or caps are designed to be removed to permit emptying of the bottle and afterward restored to normal position and re-employed in the repeated use of the bottle. Removable tops or caps of this class afford no protection against tampering with the contents or against the unauthorized re-use of the bottle by other dealers, and in practice milk shipped or conveyed under these circumstances is frequently robbed of its cream or adulterated, without detection.

The class of removable tops above referred to are also objectionable in that the top and wire fastening devices prevent the bottle from being properly cleansed and by corroding frequently affect the contents and convey impurities to the milk and cream.

The improvements constituting my present invention are designed to effectually overcome the objections and disadvantages above set forth, and insure the receipt by the consumer of the contents as shipped by the dealer by providing for immediate detection of any tampering with the cap of the bottle in transit.

Figure 1:
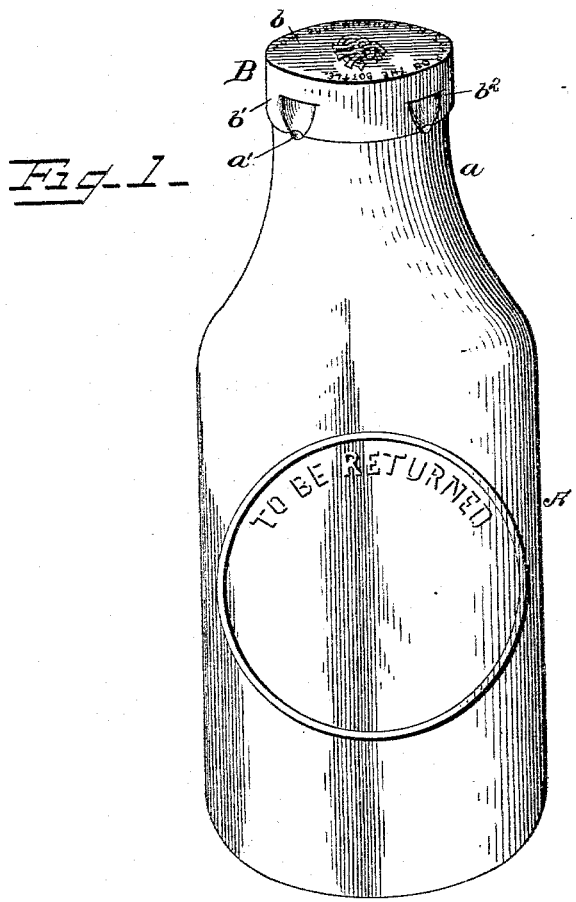
Figure 2:
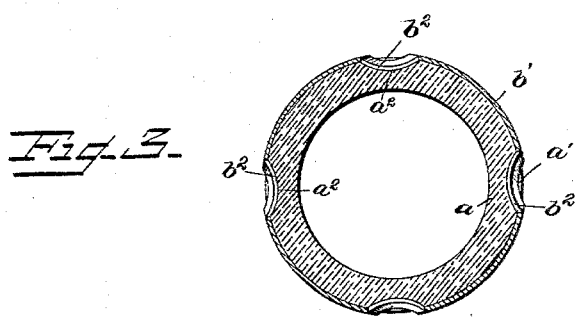
Figure 2:
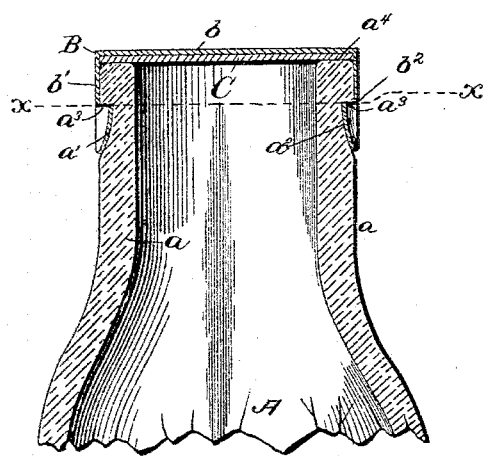
Figure 4:
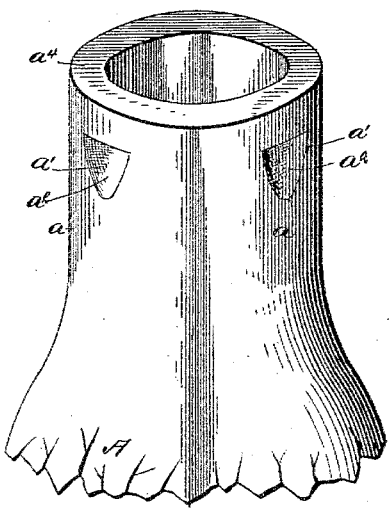
Figure 5:
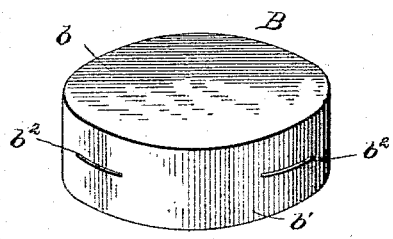
Figure 6:
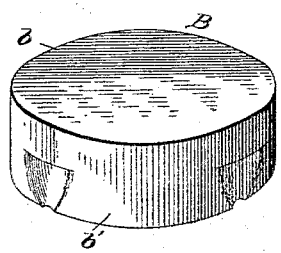

In the drawings—Figure 1 is a perspective view of a capped milk bottle embodying my improvements. Fig. 2 is a detail vertical transverse sectional view. Fig. 3 is a detail horizontal sectional view, taken on the line $x$—$x$, Fig. 2. Fig. 4 is a detail perspective view, showing the neck of the bottle, with the cap detached. Fig. 5 is a detail perspective view of the cap, before it is secured in position. Fig. 6 is a detail perspective view, showing the cap as secured in position.

Corresponding parts in all the figures are denoted by the same letters of reference.

Referring to the drawings, A designates the bottle, which may be in the main of any suitable shape and is preferably formed of glass. The bottle may, however, be constructed of any other suitable material.

In carrying out my improvements, the bottle is provided with a straight parallel neck, $a$, the exterior surface of the neck at the top or mouth being unobstructed by any ridges, beads, or projections. In the straight neck $a$ are provided indentations or recesses, $a'$, arranged in a circumferential series (preferably four) and preferably constructed with an inclined concave main portion, $a^2$, extending upwardly and inwardly to and forming a straight shoulder or wall, $a^3$. These shoulders or walls $a^3$ forming the tops of the indentations or recesses $a'$ are located a short distance below the top edge, $a^4$, of the neck of the bottle. This annular edge $a^4$ is preferably approximately flat, as shown.

B designates the safety cap, which is formed of tin foil or an analogous soft or pliable material, and is adapted to be applied to the bottle by means of an ordinary rubber hydraulic press or in any other suitable manner. This cap embodies a flat disk or body portion, $b$, and an annular depending flange, $b'$. At proper intervals in the flange or collar portion $b'$, are provided slits or cuts, $b^2$, corresponding to the shoulder $a^3$ of the indentations or recesses in the neck of the bottle. A disk or cap, C, of paper or other suitable material, corresponding to the disk or body of the safety cap, is inserted between the latter and the head of the bottle, when the safety cap B is secured in position.

In practice, when the bottle is filled, the pliable cap B is applied over the mouth, with the series of slits $b^2$ registering with the shoulders $a^3$. The material of the cap is then pressed into the indentations or recesses $a^2$, and will neatly conform thereto, when the shoulders $a^3$ at the top of the indentations in the bottle form a lock for the cap, which prevents removal of the latter without disturbing the material of the safety cap and thus showing manifest tampering. When the contents of the bottle are used by the consumer, the soft safety cap can be readily and conveniently removed. By reason of the nature of my improved safety cap and the relative construction and arrangement of the bottle and the cap, any tampering with the latter after it has been applied and the bottle sealed will be at once manifest. When the bottles are returned and refilled, new caps are then applied.

My improved safety cap thus serves as an effective safe-guard against tampering with or adulteration of the contents and against unauthorized re-use of the bottle, does not affect the contents, and when applied after the bottle is filled serves to hermetically seal and insure the quality and purity of the milk and cream.

Having thus described my invention, I claim and desire to secure by Letters Patent—

1. As an improvement in capped milk bottles, the combination, with the bottle having the straight parallel neck provided in its exterior surface with indentations or recesses arranged in a circumferential series and embodying an inclined concave main portion extending upwardly and inwardly to and forming a straight shoulder or wall, of the soft or pliable safety cap embodying the main disk or body portion and the annular depending flange having slits or cuts corresponding to the shoulder of the indentations or recesses in the neck of the bottle, the material of the safety cap being pressed into said indentations or recesses and conforming thereto, substantially as and for the purpose set forth.

2. As an improvement in capped milk bottles, the combination, with the bottle provided in the exterior surface of its neck with indentations or recesses arranged in a circumferential series and embodying an inclined concave main portion extending upwardly and inwardly to and forming a straight shoulder or wall, of the soft or pliable safety cap embodying the annular depending flange provided with slits or cuts corresponding to said shoulders, the material of the safety cap being pressed into said indentations and conforming thereto, substantially as and for the purpose set forth.

3. The herein described improved capped milk bottle, comprising the bottle having the straight parallel neck $a$ in which are formed the recesses or indentations $a'$ embodying the inclined concave main portion $a^2$ and the straight top shoulder or wall $a^3$ and provided with the approximately flat annular flange $a^4$, the soft or pliable safety cap embodying the flat disk $b$ and the annular depending flange $b'$ having the slits or cuts $b^2$ corresponding to the shoulders $a^3$, the material of the cap being pressed into the recesses $a'$ and conforming thereto, and the disk or cap C inserted between the disk or body of the safety cap and the flat annular edge $a^4$, substantially as and for the purpose set forth.

4. The herein described safety cap formed of soft or pliable material and embodying the disk or body portion and an annular depending flange provided with the slits or cuts $b^2$ arranged in a circumferential series, substantially as and for the purpose set forth.

5. The herein described improvement in capped milk bottles, comprising the bottle having a circumferential series of shouldered indentations or recesses in the exterior surface of its neck, and a removable soft or pliable safety cap applied over the mouth of the bottle and provided with slits or cuts conforming to the shoulder of said indentations and having the material of the cap pressed into said recesses and conforming thereto, the pressed-in portion of the soft cap forming at the slit or cut an edge abutting against the shoulder of the recess, whereby the safety cap cannot be removed without disturbing the material of the same and permanently affecting the appearance of the cap, substantially as set forth.

6. The herein described improved capped bottle of the class set forth, comprising the bottle having a series of exterior indentations or recesses forming a top shoulder, in combination with the cap provided with a series of slits or cuts arranged with relation to said top shoulders of the indentations or recesses and having the material of the cap pressed into the latter below said slits or cuts, whereby the edge of said slits abuts against said shoulders, substantially as set forth.

In testimony whereof I affix my signature in presence of two witnesses.

HAYDEN H. HALL.

Witnesses:
DAVID B. HETZEL,
LEWIS VAN BLANOM.